United States Patent Office 3,477,913
Patented Nov. 11, 1969

3,477,913
METHOD OF PRODUCTION OF UROKINASE
Nathan H. Sloane, Germantown, Tenn., assignor to Century Laboratories, Inc., a corporation of Delaware
No Drawing. Continuation-in-part of application Ser. No. 651,707, July 7, 1967. This application Oct. 31, 1967, Ser. No. 679,552
Int. Cl. C07g 7/026
U.S. Cl. 195—66         19 Claims

ABSTRACT OF THE DISCLOSURE

Urokinase is extracted from human urine by its adsorption on a nucleoprotein-tennate complex, which is a precipitate resulting from the action of tannic acid on a nucleic acid. The adsorbed urokinase is solubilized by treating the urokinase-containing precipitate with cold alkali and purifying the urokinase solution by dialysis. The nucleoprotein-tennate complex is formed either in situ by the addition of tannic acid to urine or externally by the addition of tannnic acid to a nucleic acid such as microbiological or plant proteins or human serum proteins. Where the nucleoprotein-tennate complex is produced externally, the precipitate is either suspended in solution and added to human urine or packed into a column with a supporting material through which the urine is passed, from which point in the process the procedure is the same as where it is formed in situ. Further purification of the urokinase is accomplished by a series of selective precipitation and solubilization steps.

CROSS REFERENCES TO RELATED APPLICATIONS

This application is a continuation-in-part of my prior copending application, Ser. No. 651,707, filed July 7, 1967, which in turn is a continuation-in-part of my prior copending application, Ser. No. 625,019, filed Mar. 22, 1967, which in turn is a continuation-in-part of my copending application, Ser. No. 586,968, filed Oct. 17, 1966.

BACKGROUND OF THE INVENTION

Field of the invention

This invention relates to a method for the production and purification of urokinase. In particular, it relates to a method for the extraction of urokinase from human urine by its absorption on a nucleoprotein-tennate complex, which is a precipitate resulting from the action of tannic acid on a nucleic ocid. The nucleoprotein-tennate complex is formed either in situ through the addition of tannic acid to urine or externally through the addition of tannic acid to a nucleic acid such as microbiological or plant proteins or human serum proteins. The urokinase-containing tennate complex is then separated from the urine and the absorbed urokinase is made soluble by the addition of alkali. The urokinase is collected and purified by dialysis. Further purification of the urokinase is then accomplished by a series of selective precipitation and solubilization steps.

Description of the prior art

Urokinase, a substance found in mammalian urine, is of great importance in the treatment of certain blood disorders, such as those which tend to cause the formation of blood clots in the cardiovascular system. Persons afflicted with such disorders must be treated for this condition before thrombosis occurs and such treatment frequently involves the administration of urokinase which dissolves blood clots and prevents the further formation of clots.

Urokinase is an enzyme confactor which stimulates the production of the clot-dissolving proteolytic enzyme, plasmin, in the blood. Bacterial filtrates, such as staphylokinase and streptokinase, also have the ability to promote the formation of plasmin. The great quantities of urine which are available as a source of urokinase, however, make a method which utilizes this source economically desirable. The large volume of urine required to obtain sufficient amounts of urokinase require a method wherein a urokinase-rich fraction of comparatively small unit volume can be quickly and efficiently isolated from the urine.

Heretofore, urokinase has been obtained from urine by its adsorption on benzoic acid as disclosed in U.S. Patent No. 2,989,440, patented June 20, 1961. Benzoic acid does not combine chemically with urokinase, but rather, the urokinase is adsorbed on the benzoic acid and, as a result, necessitates a number of cumbersome and inefficient steps for its purification. The process disclosed in the foregoing patent is, therefore, not entirely satisfactory for those reasons.

It is known that tannic acid will precipitate protein from solutions. However, tannic acid is well-known to be a denaturing agent which destroys enzymes as well. Therefore, tannic acid would not be expected to find use in a process for the production of the enzyme, urokinase. For example, U.S. Patent No. 2,929,841, patented Aug. 11, 1942, discloses the precipitation of protein from urine by tannic acid. However, no attempt is made to recover urokinase in the process of this patent, and, in the fact, the urokinase-containing precipitated protein, being insoluble in water under the conditions described herein, would be discarded in following that procedure.

SUMMARY OF THE INVENTION

The present invention is based on the discovery that urokinase can be efficiently extracted from urine by its adsorption on a nucleo protein-tennate complex, which is a precipitate formed by the action of tannic acid on a nucleic acid. In this process, one can utilize large quantities of urine and, in one basic step, efficiently extract the urokinase, effectively reducing, immediately in the process, the great bulk of material to be handled in isolating the pure urokinase. In effect, this invention provides a means whereby a urokinase-rich fraction, which is comparatively small in unit volume, can be efficiently and economically isolated for further purification procedures. Broadly stated, this invention comprises a method for producing urokinase from human urine by adsorbing it on a nucleoprotein-tennate complex, separating the urokinase-containing tennate complex from the urine, solubilizing the adsorbed urokinase by treating it with cold alkali and purifying the urokinase solution by dialysis. The urokinase may then be further purified to the desired degree of purity. The nucleoprotein-tennate complex is formed either in situ by the addition of tannic acid to urine or externally by the addition of tannic acid to a nucleic acid. In the case of the external production of the nucleoprotein-tennate complex, the tannate precipitate is either suspended in solution and added to human urine or packed into a column with an inert supporting material through which the urine is passed, from which point in the process the procedure is the same as where it is formed in situ.

DESCRIPTION OF THE PREFERRED PRACTICE OF THE INVENTION

The urine which is to be processed by the method described herein is collected in the presence of a preservative, such as chloroform, to prevent the growth of bacteria which could cause a harmful reaction in a patient receiving urokinase manufactured therefrom.

The nucleoprotein-tannate complex herein may be formed in situ by the addition of tannic acid, at a slightly acid pH, to urine which immediately produces a precipitate. Advantageously, tannic acid is added to the urine in quantities sufficient only for the formation of a tannate precipitate sufficient to adsorb the urokinase therefrom.

The tannate precipitate on which the urokinase is adsorbed is easily separated from the urine by any suitable means such as centrifugation or filtration. The urokinase-containing tannate precipitate, after being separated from the urine, e.g., by centrifugation, is washed with distilled water until the washings are free of acid.

Where the nucleoprotein-tannate precipitate is to be formed externally, a wide range of nucleoprotein, of human origin, can be utilized as, for example, human serum proteins such as serum albumin and serum globulin, and other proteins prepared from human origin. A protein of human origin is used because where the protein is of non-human origin, an antigenic response or an allergic reaction could be produced in a human being upon the introduction of this material. Similarly, the nucleoprotein-tannate complex can be prepared from a microbiological plant source such as yeast.

Where the nucleoprotein-tannate complex is prepared externally, the washed precipitate may be suspended in distilled water and a suspension of this tannate added to the urine at a ratio of from about 5 mg. to about 100 mg. of precipitate per liter of urine. This mixture is then stirred at room temperature during which time the urokinase is extracted from the urine and adsorbed onto the tannate precipitate. Where this precipitate is formed in situ, the urokinase is extracted directly from the urine into the precipitate that is formed therein.

After the mixing period, the urokinase-containing precipitate is removed by centrifugation and suspended in cold 0.05 M tris-HCl buffer [tris (hydroxymethyl) aminomethane] at pH 7.4. The adsorbed urokinase is then solubilized by the addition of a cold alkaline solution, the pH of which is in the range from about pH 9 to 10, to the urokinase-containing precipitate suspension. The urokinase solution is then dialyzed against cold 0.05 M tris buffer at pH 7.4 to remove tannic acid and other dialyzable impurities. The concentrate contains approximately 10,000 CTA units per liter of urine.

In a further embodiment of this invention, the urokinase is extracted from urine by its adsorption on a nucleoprotein-tannate precipitate which is supported by an inert matrix such as Celite (trade name for Johns-Manville diatomaceous-earth fillers) or any other similar inert material such as diatomaceous-earth silicas. The nucleoprotein-tannate precipitate is mixed with the inert support material and packed into a column. The urine to be treated is then passed through the column. This serves to extract and adsorb the urokinase on the material in the column while the spent urine is discarded. The column is then washed with cold water to remove any urine or other impurities which remained in the column. The urokinase is then eluted from the column by passing therethrough cold 0.05 M tris buffer at high alkaline pH. The urokinase which is collected is then dialyzed to remove impurities. For all practical purposes, essentially all of the urokinase is extracted from the urine in the first step in the process of this invention, namely, that of adsorption of the urokinase onto the nucleoprotein-tannate precipitate. This is the case whether the urine is mixed with the nucleoprotein-tannate complex either in suspension or flowed through a column thereof.

The following examples illustrate the method described herein of extracting urokinase from urine by its adsorption on a nucleoprotein-tannate complex.

Example 1

A nucleoprotein-tannate precipitate was prepared by dissolving 50 mg. of human serum albumin and 50 mg. of purified yeast nucleic acid in 10 ml. of $H_2O$ and adding thereto an excess of tannic solution (5 gr. tannic acid, 120 ml. $H_2O$, 120 ml. ethanol and 2.5 ml. glacial acetic acid) and mixing until precipitation was complete. This precipitate was separated by centrifugation and washed with distilled water until free of acid. The precipitate was then suspended in water and was ready for use in the process.

To 125 ml. of human urine was added 3 ml. of the washed nucleoprotein-tannate precipitate suspension. This mixture was stirred for one hour at room temperature (a longer period of time than was necessary to assure complete adsorption of the urokinase) and the urokinase-containing precipitate was then removed by centrifugation. The urokinase-containing precipitate was suspended in 7 ml. of cold 0.05 M tris buffer at pH 7.4 and cold 0.2 N NaOH was added dropwise to affect solution of the urokinase at about pH 9–10. During this process the mixture was cooled in an ice bath. The urokinase was then dialyzed against 0.05 M tris buffer at pH 7.4 to remove excess alkali, tannic acid and other dialyzable impurities. This urokinase concentrate contained a total of 1250 CTA units (a CTA unit is a measure of the activity of urokinase) or 12,500 CTA units per liter of urine.

Example 2

This example demonstrates the effectiveness of the adsorption of urokinase by passing human urine through a column of nucleoprotein-tannate precipitate which is supported on an inert matrix. This matrix can be Celite or any other diatomaceous-earth silica.

To 6 gr. of Celite 545 was added, with thorough mixing, 3 ml. of a suspension of nucleoprotein-tannate precipitate (equivalent to 12 mg.). The Celite-precipitate mixture was moistened with water and packed into a column 2 cm. by 5 cm. 200 ml. of urine were passed through this column. The column was then washed with cold water until the washings were free of color. Urokinase was then eluted from the column by passing cold 0.05 M tris buffer through the column at pH 9.3. The urokinase was collected with the alkaline solution that emerged from the column. This material was dialyzed against 0.05 M tris buffer at pH 7.4. The solution contained 2,000 CTA units of urokinase or approximately 10,000 CTA units per liter.

The urokinase concentrate obtained by the methods heretofore described can be further purified by the methods described in my copending patent applications, U.S. Ser. Nos. 625,019 and 651, 707, filed March 22, 1967 and July 7, 1967, respectively. As described therein, the addition of tannic acid to urine results in the precipitation therefrom of a urokinase-containing nucleoprotein-tannate precipitate. This precipitate may be separated from the urine by any suitable means such as centrifuging, decanting, filtering, etc. The precipitate may then be suspended in a buffer solution to which is added a highly alkaline solution, such as sodium hydroxide or other strong alkali. On the addition of the alkaline solution (which must not be allowed to go above about pH 10 and which must not go appreciably below pH 8) the precipitate is dissolved. The solubilized urokinase is then dialyzed to eliminate tannic acid and any other impurities which may be present. The solution retained after dialysis is the crude urokinase protein concentrate which is then further treated to obtain a purified urokinase.

The solution of crude urokinase concentrate is mixed with cold (about 0° C.) butyl alcohol. The cold butyl alcohol, while leaving the urokinase in solution, denatures the extraneous proteinaceous material which is present, and causes it to gel. This gel rises to the top of the urokinase solution, is easily separated therefrom, and is discarded. The urokinase solution is then dialyzed against an aqueous buffer solution such as tris (hydroxymethyl) aminomethane. Dialysis serves to remove any impurities, such as alkali and salts, which may have formed in the process. After dialysis, the urokinase is in a purified form in aqueous solution.

Although butyl alcohol is particularly suitable and prefered herein, in some instances higher alcohols, such as the C–5 and C–6 alcohols, may be used. Alcohols lower than butyl alcohol will not precipitate the extraneous proteinaceous material in the solution of crude urokinase protein concentrate. The butyl alcohol must be cold to avoid denaturation of the urokinase. Ice bath temperature (about 0° C.) has been found to be quite satisfactory for this purpose.

A sufficient amount of the butyl alcohol to precipitate extraneous proteinaceous material should be used. Generally such amount is about 15% of the volume of the crude urokinase protein concentrate solution. If desired, a larger quantity of alcohol may be employed depending upon the particular crude urokinase solution to which it is added. Factors such as unnecessary dilution, ease of handling, etc., are, of course, to be taken into consideration.

The urokinase is in a relatively high concentration and sufficiently pure at this stage of the purification process so that it can be brought to a highly purified state with relatively little further processing.

The purified urokinase solution, obtained as described above, is then further purified and concentrated by additional selective separation steps. The purified urokinase solution is treated by the addition thereto of dilute acid which precipitates the urokinase together with other extraneous protein out of solution. Any dilute acid, organic or inorganic, that provides a sufficient concentration of free hydrogen ions to cause precipitation will suffice. The precipitate thus formed is a urokinase-extraneous protein mixture.

The urokinase is then separated out of the precipitate mixture by selectively solubilizing it by the addition thereto of cold (about 0° C.) ethyl alcohol and permitting the resulting mixture to remain at about room temperature for a sufficient amount of time until the urokinase is substantially solubilized. This alcoholic solution of urokinase is then separated from any insoluble material present and is then dialyzed to reprecipitate the urokinase in a highly purified form.

The ethyl alcohol is added to the precipitate mixture at ice bath temperature (about 0° C.) in an amount sufficient to solubilize the urokinase. I have found that amounts of alcohol ranging from about ½ to about 3 times the volume of precipitate mixture have been advantageous in solubilizing the urokinase. Generally, the alcoholic urokinase mixture is allowed to remain at room temperature for about three (3) hours but this time period is not critical. It will be readily apparent to those skilled in the art that greater or lesser periods of time will be required for solubilization of the urokinase depending upon the quantity of urokinase which is present in the mixture and the degree of solubilization that it is desired to attain. In addition to its solubilization effect on the precipitate mixture, the alcohol serves the important function of destroying viruses, especially the hepatitis virus, with which the urokinase mixture might be contaminated.

The ethyl alcohol-solubilized urokinase is dialyzed against buffer solution, e.g., tris (hydroxymethyl) aminomethane, which precipitates the urokinase. The urokinase precipitate can be separated and collected by any suitable means such as centrifugation, filtration or the like. The urokinase precipitate is then made soluble by the addition thereto of a sufficient amount of cold (about 0° C.) weak alkali. Sodium hydroxide has been found to be quite effective for this purpose, but it is contemplated that any common alkali solution will be effective, provided the pH of the solution is not allowed to go above about pH 10. The alkali is added to the precipitate until solubilization is effected, followed by dialysis. This solubilization step is carried out at low temperature to prevent the destruction of the heat labile urokinase.

Alternatively, the urokinase precipitate may be solubilized by the addition thereto of urea. The urea is added to the urokinase precipitate in buffer solution until the precipitate dissolves. After solubilization has been effected, the urea is then dialyzed out of solution.

The following examples illustrate these purification processes in more detail.

Example 3

A crude urokinase protein concentrate, produced from 5 liters of urine, was suspended in an aqueous buffer solution and dissolved by the addition thereto of sodium hydroxide and dialyzed against buffer at about neutral pH. To 100 ml. of the crude urokinase concentrate solution (at about 0° C.) was added 50 ml. of butyl alcohol at about 0° C. The mixture is then centrifuged to collect the precipitated extraneous proteinaceous material which is discarded. The soluble urokinase portion is collected and dialyzed at 4° C. against 2 liters of 0.05 M tris (hydroxymethyl) aminomethane buffer at pH 7.4. The dialyzed material containing the urokinase is in a relatively purified form, i.e., 1,000 CTA units per mg. of protein (a CTA unit is a measure of the activity of urokinase). The crude urokinase protein concentrate, which was used as the starting material, contained only 250 CTA units per mg. of protein.

As stated above, it has been found preferable to employ the butyl alcohol at a temperature of 0° C. in order to avoid any substantial denaturation of the heat labile urokinase. Accordingly, in some instances the temperature of the butyl alcohol may be higher than 0° C. so long as there is no substantial denaturation of the urokinase.

Example 4

To 100 ml., at about 0° C., of the dialyzed butyl alcohol-treated concentrate (1,000 CTA units per mg. of protein; equivalent to 5 liters of urine) is added 10 ml. of cold 0.1 N HCl which precipitates the urokinase and other proteins. To the precipitated urokinase mixture is added 100 ml. of cold (about 0° C.) absolute ethyl alcohol. This alcoholic urokinase mixture is then removed from the ice and allowed to remain at room temperature for 3 hours to substantially solubilize the urokinase. The mixture is then centrifuged to separate the urokinase from other insoluble material. The insoluble material is discarded and the remaining alcoholic solution of urokinase is dialyzed at 4° C. against several 2 liter changes of 0.05 M tris (hydroxy methyl) aminomethane buffer at pH 7.4. The dialysis sack contains a precipitate (purified urokinase) which is collected by centrifugation and washed several times with cold buffer. The urokinase precipitate is then suspended in 100 ml. of the buffer and 0.2 N NaOH is added dropwise to effect solution of the urokinase. The urokinase solution contains approximately 10,000 CTA units per mg. of protein. Other solvents for the urokinase can be used, such as a urea solution in a neutral buffer at about pH 7.

In a further embodiment of the purification process of urokinase, a slightly alkaline (about pH 7.4) solution of versene (ethyl diamine tetra-acetic acid) may be added to a concentration of above about 0.005 M to a semi-purified aqueous solution of urokinase concentrate. To this versene solution of urokinase is added a suspension of DEAE cellulose (diethyl aminoethyl cellulose) and the mixture stirred. The presence of the versene at this concentration, under slightly alkaline conditions, prevents the adsorption of the urokinase on the cellulose. Although a versene concentration of above about 0.005 M is specified herein it has been found that a range of from 0.01 M to 0.05 M is effective for this purpose. The coloring components and other extraneous protein present in the solution, however, are readily adsorbed on the cellulose under these conditions. The cellulose is then separated by centrifugation and discarded while the versene solution of urokinase is collected. This solution is then dialyzed to remove the versene while leaving the urokinase in a highly purified and concentrated form. Dialysis is performed in the presence of glucose which is at a concentration of 0.05 M to 0.10 M in the solution. The glucose stabilizes the urokinase and prevents its decomposition during dialysis.

The urokinase can be further purified by adding water to a versene-urokinase solution in order to dilute the versene concentration to a level well below 0.0025 M. After a sufficient dilution of the versene has been accomplished, it no longer prevents the urokinase from being adsorbed onto cellulose. At this point a DEAE cellulose suspension is added to the dilute urokinase-versene solution and the urokinase is then adsorbed onto the cellulose. The cellulose is separated from the solution by centrifugation and the supernatant solution which contains various impurities is discarded. The cellulose is then washed with 0.05 M tris (hydroxymethyl) aminomethane buffer solution at pH 7.4. The urokinase is then eluted from the cellulose by increasing the versene concentration to a level above 0.005 M and preferably in the range from about 0.01 M to 0.05 M through the addition of versene in tris buffer solution at a slightly alkaline pH value. The cellulose, which contains various impurities, is then separated by centrifugation and is discarded. The supernatant liquid which contains the urokinase is retained. The urokinase-versene solution is then dialyzed to remove the versene and the urokinase which is retained is in a highly purified and concentrated form.

The following examples illustrate these purification processes in greater detail.

Example 5

To 5 ml. of an aqueous solution of urokinase concentrate obtained by the adsorption on a nucleoprotein-tannate precipitate of urine (equivalent to one liter of urine) and purified as described in my copending applications, identified herein, is added versene to a concentration of 0.01 M and the pH of the solution is adjusted to 7.4. To this solution is added 5 ml. of a DEAE cellulose suspension containing 26 mg. of washed cellulose per ml. of suspension. The mixture is stirred for 40 minutes and its temperature is maintained at a temperature between 0° C. and 20° C. The cellulose is then removed by centrifugation and the supernatant liquid which contains the enzymatic activity (urokinase) is collected. To the versene solution of urokinase is added glucose to a concentration of from 0.05 M. to 0.10 M and the solution is dialyzed to remove the versene. The specific activity of urokinase is increased by this purification step from approximately 10,000 CTA units to 20,000 CTA units per mg. of protein.

Example 6

To 10 ml. of the urokinase solution obtained in Example 5 is added 10 ml. of a DEAE cellulose suspension containing 26 mg. of washed cellulose per ml. of suspension. This mixture is stirred for one hour at a temperature between 0° C. and 20° C. and the cellulose which has adsorbed the urokinase is recovered by centrifugation (the supernatant solution is discarded). The cellulose is washed several times with 5 ml. volumes of 0.05 M tris buffer. The urokinase is eluted from the cellulose by suspending the washed cellulose in a 0.05 M tris-0.05 M versene solution which is adjusted to pH 7.4. This mixture is stirred for one hour at 4° C. The cellulose is then removed by centrifugation and the supernatant liquid which contains the urokinase is collected. To this urokinase-containing solution is added glucose to a concentration of from 0.05 M to 0.10 M. The specific activity of the urokinase is thereby increased from approximately 20,000 CTA units to 40,000 CTA units per mg. of protein.

I claim:
1. A method for the production of urokinase which comprises the steps of
   forming a nucleoprotein-tannate precipitate by the addition of tannic acid to a protein nucleic acid,
   adding said precipitate to human urine to adsorb urokinase from said urine,
   separating and collecting the urokinase-containing precipitate,
   solubilizing said urokinase by adding an alkali solution to said urokinase-containing precipitate suspension, said solution being maintained at a pH in the range between pH 8 and pH 10, and
   removing impurities from the solubilized urokinase.

2. A method according to claim 1 in which said protein-nucleic acid is derived from a microbiological or plant source.

3. A method according to claim 1 in which said protein-nucleic acid is derived from human serum proteins.

4. A method according to claim 1 in which said urokinase-containing precipitate is separated by centrifugation, said urokinase is solubilized by the addition of cold sodium hydroxide to said urokinase-containing precipitate and said impurities are separated from the solubilized urokinase by dialysis.

5. A method according to claim 1 in which said nucleoprotein-tannate precipitate is supported on an inert matrix.

6. A method according to claim 5 in which said nucleoprotein-tannate precipitate supported on an inert matrix is packed into a column and urine is passed through said column whereby urokinase is extracted from said urine by its adsorption on the nucleaprotein-tannate precipitate.

7. A method according to claim 5 in which said inert matrix is diatomaceous silica.

8. A method for purifying a urokinase-containing nucleoprotein-tannate precipitate obtained by the method of claim 1, which comprises:
   (i) dissolving said urokinase-containing precipitate in an alkaline solution not higher than pH 10 and dialyzing against buffer at about pH 7,
   (ii) mixing the crude urokinase solution obtained thereby with a sufficient amount of cold butyl alcohol to render insoluble the proteinaceous material, other than urokinase, which is present in the crude urokinase solution,
   (iii) separting the soluble urokinase portion from the insoluble protein precipitate and collecting said urokinase portion, and
   (iv) dialyzing the soluble urokinase portion against buffer solution to eliminate impurities.

9. A method according to claim 8 in which said butyl alcohol is about 0° C.

10. A method according to claim 8 in which said alkaline solution is a solution of sodium hydroxide.

11. A method for further purifying the urokinase produced in accordance with claim 8 which comprises:
   (i) adding dilute acid to said urokinase solution to precipitate urokinase and extraneous proteinaceous material therefrom,
   (ii) solubilizing the urokinase by adding cold ethyl alcohol and permitting the solution to remain at about room temperature for a sufficient amount of time to permit the solubilization of the urokinase,
   (iii) separating and collecting the solubilized urokinase,
   (iv) dialyzing the solubilized urokinase against buffer to form a precipitate of urokinase,
   (v) solubilizing the precipitated urokinase by the addition thereto of a solvent.

12. A method according to claim 11 in which said solvent is dilute sodium hydroxide.

13. A method according to claim 11 in which said solvent is a urea solution in a neutral buffer at about pH 7.

14. A method for further purifying and concentrating an aqueous solution of a urokinase concentrate obtained by the method of claim 11, which comprises:
   (i) adding versene to said solution to a concentration in the range from 0.005 M to 0.05 M;
   (ii) adjusting the pH of said solution to a slightly alkaline value;
   (iii) adding a DEAE cellulose suspension to said solution and mixing, the mixture being kept at a temperature in the range from 0° C. to 20° C. during mixing;
(iv) removing the cellulose; and
(v) collecting the soluble urokinase concentrate solution.

15. A method according to claim 14 in which said pH is at a value of about 7.4 and said versene solution is at a concentration of about 0.05 M.

16. A method according to claim 15 in which said cellulose is removed by centrifugation and said soluble urokinase concentrate solution is dialyzed against buffer in the presence of glucose to remove impurities.

17. A method for further purifying the soluble urokinase concentrate solution produced in accordance with claim 14, which comprises:
(i) diluting said urokinase solution to bring the versene concentration below 0.0025 M;
(ii) adding a DEAE cellulose suspension to said solution and mixing, the mixture being kept at a temperature in the range from 0° C. to 20° C. during mixing;
(iii) separating and collecting the cellulose;
(iv) washing the cellulose with buffer solution;
(v) suspending the washed cellulose in a buffer solution of versene at a concentration in the range from about 0.01 M to 0.05 M and buffer and adjusting the pH of said solution to a slightly alkaline value;
(vi) removing the cellulose;
(vii) collecting the soluble urokinase concentrate solution; and
(viii) adding glucose to a concentration in the range from 0.05 M to 0.10 M to said urokinase solution.

18. A method according to claim 17 in which said mixture is kept at a temperature of about 0° C. during mixing and said pH is at a value of about 7.4.

19. A method according to claim 18 in which said cellulose is removed by centrifugation and said soluble urokinase concentrate solution obtained thereby is dialyzed against buffer in the presence of glucose to remove impurities.

References Cited

UNITED STATES PATENTS 3,355,361  11/1967  Lesuk _____ 195—62

LIONEL M. SHAPIRO, Primary Examiner

PO-1050
(5/69)

UNITED STATES PATENT OFFICE
CERTIFICATE OF CORRECTION

Patent No. 3,477,913      Dated November 11, 1969

Inventor(s) Nathan H. Sloane

It is certified that error appears in the above-identified patent and that said Letters Patent are hereby corrected as shown below:

| COLUMN | LINE | READS | SHOULD READ |
|---|---|---|---|
| 1 | 21 | tannnic | tannic |
| 1 | 23 | tennate | tannate |
| 1 | 47 | absorption | adsorption |
| 1 | 49 | tennate ocid | tannate acid |
| 1 | 53 | tennate | tannate |
| 1 | 55 | tennate | tannate |
| 1 | 71 | absorbed | adsorbed |
| 1 | 71 | confactor | cofactor |
| 2 | 23 | 2,929,841 | 2,292,841 |
| 2 | 28 | in the fact | in fact |
| 2 | 34 | tennate | tannate |
| 2 | 46 | tennate | tannate |
| 2 | 47 | tennate | tannate |
| 2 | 51 | tennate | tannate |
| 2 | 55 | tennate | tannate |
| 3 | 1 | tennate | tannate |
| 8 | 38 | separting | separating |

SIGNED AND
SEALED
MAY 26 1970

(SEAL)
Attest:

Edward M. Fletcher, Jr.
Attesting Officer

WILLIAM E. SCHUYLER, JR.
Commissioner of Patents